MAGNETIC CODE TRANSLATOR

Filed Dec. 14, 1959 2 Sheets-Sheet 1

INVENTOR
DONALD F. BUSCH
BY [signature]
AGENT

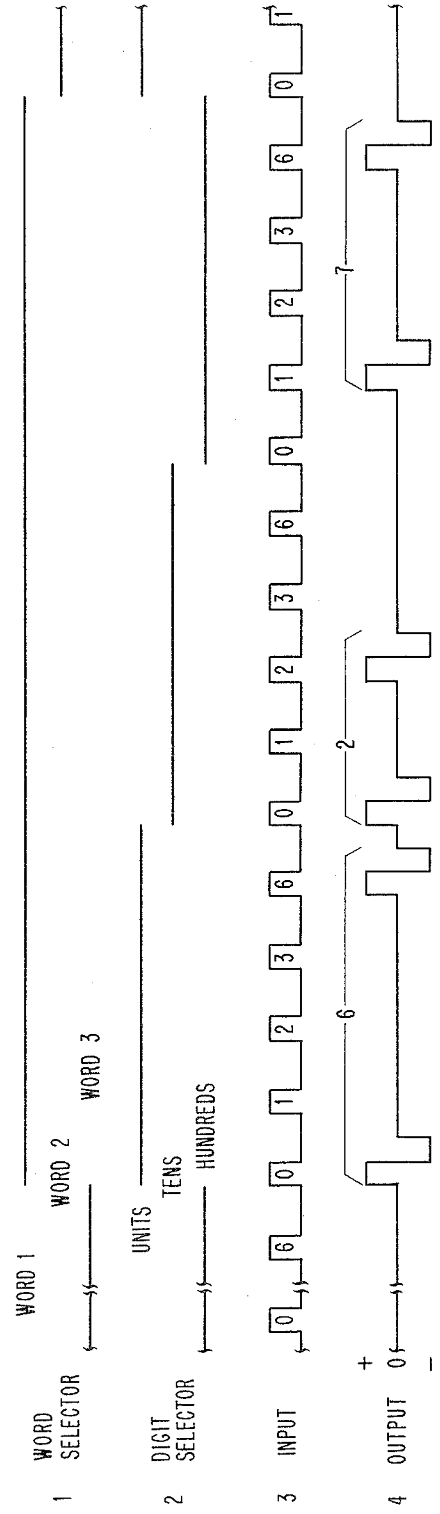
FIG. 3
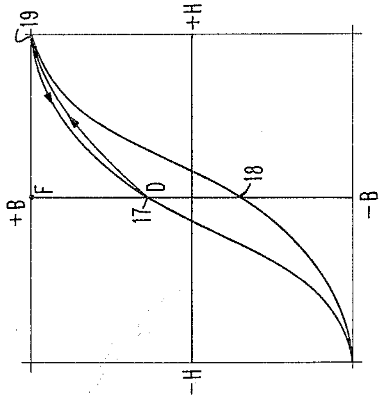
FIG. 2
| DIGIT | 0 | 1 | 2 | 3 | 6 |
|---|---|---|---|---|---|
| 0 | | X | X | | |
| 1 | X | X | | | |
| 2 | X | | X | | |
| 3 | X | | | X | |
| 4 | | X | | X | |
| 5 | | | X | X | |
| 6 | X | | | | X |
| 7 | | X | | | X |
| 8 | | | X | | X |
| 9 | | | | X | X |
2 OUT OF 5 CODE
FIG. 4

United States Patent Office 3,174,145

Patented Mar. 16, 1965

3,174,145
MAGNETIC CODE TRANSLATOR

Donald F. Busch, Vestal, N.Y., assignor to International Business Machines Corporation, New York, N.Y., a corporation of New York Filed Dec. 14, 1959, Ser. No. 859,169
5 Claims. (Cl. 340—347)

This invention relates to code translating apparatus and more particularly to an improved code translating apparatus embodying magnetic cores.

In data processing systems, it is often desirable to convert data represented in one code to data represented in a different code to facilitate the processing of such data. Accordingly, it is a primary object of this invention to provide an improved code converter.

It is another object of the invention to provide an improved method and means for translating from decimal notation to equivalent two-out-of-five notation.

It is a further object of the invention to provide improved decimal to two-out-of-five conversion apparatus having simplified circuitry so as to facilitate construction, testing, and repair.

It is an additional object of the invention to provide decimal to two-out-of-five conversion apparatus utilizing readily available circuit components and to eliminate delicate apparatus such as vacuum tubes from the circuits.

It is still a further object of the invention to provide a converter whose output signals are directly usable without the need for amplification.

These and further objects of the present invention are achieved by providing apparatus comprising ten toroidal cores or transformers of a nonsquare loop material utilized in circuitry adapted to effect a readout of digital data stored as decimal digits in multiorder static storage means, such as, rotating switches, record card readers, and the like. The converter herein described reads out decimal digits and converts them to a serial-by-bit, serial-by-digit signal representation according to a two-out-of-five code configuration and which could be easily altered to produce other codal representation of the data stored in decimal form. Each magnetic core represents one of the decimal digits and has two primary and one or more secondary windings. The primary windings serve to pulse the magnetic cores according to the two-out-of-five code. A complete set of secondary windings, there being one winding of each set on each of the magnetic cores, is coupled to each multiorder static storage device. The use of plural sets of secondary windings permits the readout of plural multiorder static storage devices. A scanning of the static storage device digital orders in sequence while serially pulsing the magnetic core input lines will produce a serial-by-bit, serial-by-digit readout of the decimal digits stored in the multiorder storage device and in accordance with the two-out-of-five input code.

The foregoing and other objects, features and advantages of the invention will be apparent from the following more particular description of a preferred embodiment of the invention, as illustrated in the accompanying drawings.

In the drawings:

FIG. 2 is a curve of the magnetic characteristics of the materials which may be used in accordance with the present invention.

FIG. 3 is a timing chart for the circuit of FIG. 1.

FIG. 4 is a chart showing the representations of digital data in accordance with a two-out-of-five code.

Figure 1:
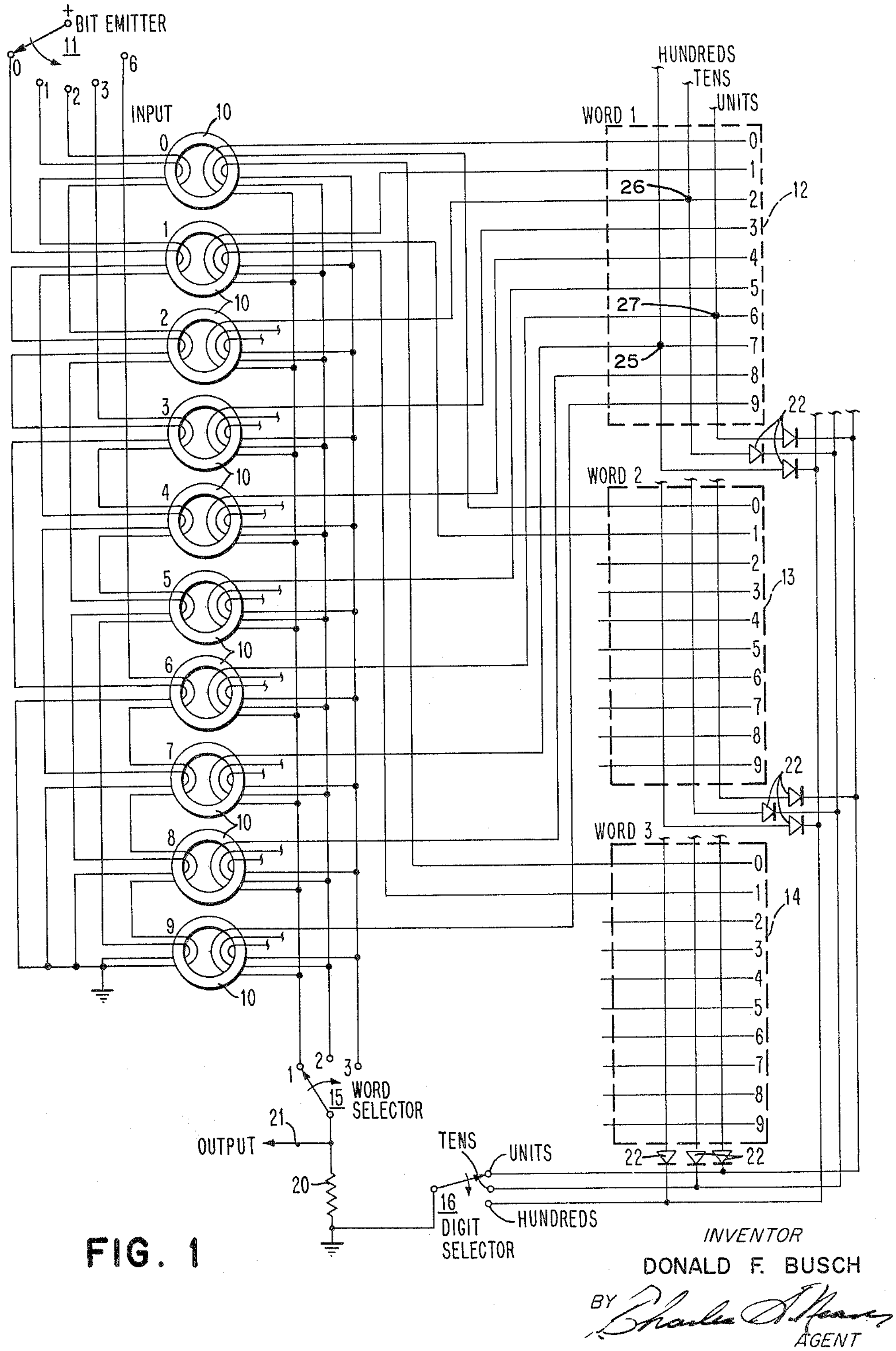
FIG. 1 is a schematic diagram of one form of the invention.

Referring to the drawings, there are shown in FIG. 1 ten toroidal saturable magnetic cores or transformers 10, preferably of a magnetically permeable material having substantially nonsquare hysteresis loop properties, there being one core for each of the decimal digits 0 through 9. Each core has two primary windings that are coupled to the "0," "1," "2," "3," and "6" bit input lines according to a two-out-of-five code configuration. The "0," "1," "2," "3," and "6" bit input lines are adapted to be individually and successively pulsed through the medium of a selective switching device referred to as a bit emitter 11. The primary windings on all cores containing the "0" bit are wired in series and connected with the "0" bit input line. The primary windings on all cores containing the "1" bit are wired in series and connected with the "1" bit input line and so on for all of the bit inputs to each of the magnetic cores.

Each of the magnetic cores 10 will have one or more secondary windings, depending upon the number of multiorder storage devices 12 in the system as will become more apparent in the description. In the illustrative embodiment, there are three secondary windings on each of the magnetic cores 10. One set of secondary windings on each of the cores 10 for the digits 0 through 9 is connected to the 0 through 9 digit order positions, respectively, of the "word one" multiorder storage device 12. A second set of secondary windings is connected to the 0 through 9 digit order positions of the "word two" multiorder storage device 13. A third set of secondary windings is connected to the 0 through 9 digit order positions of the "word three" multiorder storage device 14.

Each of the multiorder storage devices 12, 13, and 14 is individually and successively coupled to an output circuit for readout by means of the word selector emitter 15. Each order, that is, units, tens, and hundreds, etc., of the selected multiorder storage device is successively coupled for readout by means of the digit selector 16. The storage device order commons are coupled to their respective order positions of the digit selector 16 through diodes 22.

Referring to FIG. 2, there is shown an idealized nonsquare hysteresis loop for the cores 10, but it should be understood that the invention is not necessarily limited to this particular type of hysteresis loop. Points 17 and 18 are the states of maximum residual flux density which may also be referred to as the positive and negative set states. Point 19 is the positive magnetic saturation state. If the core is in the positive set state and a positive magnetizing force of sufficient magnitude, due to current flow through the primary winding, is applied to the core, the dynamic path followed is from 17 to 19 as indicated by the arrow in FIG. 2. Upon removal of the current in the primary winding, the magnetizing force falls to zero, and the dynamic path is from 19 to 17 as indicated by the arrow in FIG. 2. While in the preferred embodiment the magnetizing operation of the core is according to the positive set state, it should be understood that equally effective results can be obtained from magnetizing operations in the negative set state.

The details of operation of the circuit shown in FIG. 1 will now be presented. For purposes of illustration, we may assume the "word one" multiorder storage device 12 to be a manually settable keyboard comprising three digital orders, units, tens, and hundreds, and wherein the keys have been manipulated to establish electrical contact at the points 25, 26, and 27, respectively, so that an arbitrary value of "726" has been stored therein. With the word selector emitter 15 in its "1" position, contact will be made with the set of secondary windings on the cores 10 which are interconnected with the decimal order positions of the multiorder storage device 12. To effect a readout, the digit selector 16 must successively make contact with each order (units, tens, and hundreds) position and during the time that the digit selector 16 is positioned in each of the order positions, the bit emitter 11 must make a complete scan of the "0," "1," "2," "3," and "6" bit positions. Thus with the word selector 15 in the first position (line 1, FIG. 3) and the digit selector 16 in the units position (line 2, FIG. 3) and with a digit "6" stored in the units order of the multiorder storage device 12 at "0" bit time (line 3, FIG. 3), the pulse applied to the "0" bit input line will cause a current flow in the primary winding of the toroidal core 10 for the digit "6" (FIG. 1) driving it to saturation. The flux change in the core will cause a current flow in the secondary winding such that an output potential will be developed across the resistor 20, thereby causing an output pulse representative of a "0" bit to occur on the output line 21 (line 4, FIG. 3). With the digit selector 16 still in the units position (line 2, FIG. 3), then at "6" bit time (line 3, FIG.3), the pulse applied to the "6" input line will cause a current flow in the primary winding of the toroidal core 10 for the digit "6" driving it to saturation. The flux change in the core will cause a current flow in the secondary winding such that an output potential will be developed across the resistor 20, thereby causing an output pulse representative of the "6" bit to occur on the output line 21 (line 4, FIG. 3).

When the digit selector 16 moves to the tens order position thereby connecting the tens order common conductor with the digit "2" stored in the tens order of the multiorder storage device 12, the tens order common conductor will activate a secondary winding on the toroidal core 10 for the digit "2." As the bit emitter 11 scans the "0" through "6" input lines successively at the "0" and "2" bit times, the pulses applied to the primary windings will cause output pulses to appear on the output line 21, as indicated in line 4 of FIG. 3.

With the digit selector 16 advanced to the hundreds position, the hundreds order common will be connected with the "7" value stored in the hundreds order of the multiorder storage device 12, the secondary winding on the toroidal core 10 for the digit "7" will be activated for readout. As the bit emitter 11 scans the "0" through "6" input lines, the pulses occurring at "1" and "6" bit times which are applied to the primary windings for the "7" digit core will cause current flow in the secondary winding such that successively occurring output pulses representative of the "1" and "6" bits will occur on the output line 21, as indicated by line 4 of FIG. 3. Thus it may be seen that the digital value "726" has been converted to a serial-by-bit, serial-by-digit according to the two-out-of-five configuration with the representative signal pulses occurring on the output line 21. The output pulses appearing on output line 21 can be applied to various types of utilization means within computer systems.

A second way of providing a magnetic core type translator would include the use of cores having substantially square loop properties or characteristics. This method would require the use of an additional reset winding on each of the digital cores, which would be connected to a pulse generator so timed with respect to the input pulses that between each set of input pulses a resetting pulse will flow through the resetting coils and thus restore the cores to their initial operating point.

A very important feature of the invention herein disclosed resides in the feeding of the input pulses directly to the primary windings on the cores 10 and the producing of directly usable output pulses. This improves the response of the system as well as the efficiency and reliability. It also simplifies the system as compared with those existing in the prior art. The simplified circuitry of the present invention also facilitates testing and repair of the apparatus within the system.

A further advantage of this invention is the use of relatively simple conversion circuits which make for simple, efficient, and inexpensive conversion apparatus.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic code translator system comprising a multiorder storage device capable of storing digital data, circuit means for selectively grounding each order of said multiorder storage device, a set of saturable magnetic cores, one for each of the decimal numbers 0 through 9, a secondary winding on each of said cores being inductively coupled therewith, means interconnecting each decimal number position of said multiorder storage device with its corresponding secondary winding, an output circuit, means connecting each of said secondary windings to said output circuit, a pair of primary windings inductively coupled to each of said cores, and means to selectively pulse said primary windings according to a predetermined code configuration so as to produce a saturating level of flux in the cores whereby the formation of transient magnetic flux in the core produces an output signal in the secondary winding which is applied to said output circuit.

2. A magnetic code translator system comprising a multiorder storage device capable of storing digital data in decimal notation; circuit means for selectively and successively grounding each order of said storage device; a set of saturable magnetic cores, one for each of the decimal numbers 0 through 9; a secondary winding on each of said cores and magnetically coupled thereto; means interconnecting each decimal number position of said multiorder storage device with its corresponding secondary winding on said cores; an output circuit; means connecting each of said secondary windings with said output circuit; a pair of primary windings coupled to each of said cores; and means to selectively pulse said primary windings according to a predetermined code configuration so as to produce a saturating level of flux in the cores in response to the current flow in the pulsed primary windings so that the formation of transient magnetic flux in the core will produce an output signal in the associated secondary winding for application to the output circuit.

3. A magnetic code translating system comprising a plurality of multiorder storage devices having a plurality of decimal number positions for storing data thereat, circuit means commonly connecting like orders of said multiorder storage devices, means for selectively grounding each order of said multiorder storage devices, a set of saturable magnetic cores, one for each of the decimal numbers 0 through 9, a plurality of sets of secondary windings magnetically coupled to each of said cores, there being one complete set of windings for each of said multiorder storage devices, means interconnecting each decimal number position of said multiorder storage devices with their corresponding secondary windings, an output circuit, means for selectively connecting each of said sets of secondary windings on said cores to said output circuit, a pair of primary windings magnetically coupled to each of said cores, and means for selectively pulsing said primary windings according to a predetermined code configuration so as to produce a saturating level of flux in the cores having their primary windings pulsed so that the formation of transient magnetic flux in the cores produces an output signal which is applied to said output circuit.

4. A decimal to two-out-of-five code translating apparatus comprising a plurality of multiorder storage devices having a plurality of decimal number positions for storing data thereat in decimal notation, circuit means commonly connecting like orders of said multiorder storage devices, circuit means for selectively grounding each order of said multiorder storage device, a set of saturable magnetic cores, one for each of the decimal numbers 0 through 9, a plurality of sets of secondary windings, there being one complete set of windings for each of said multiorder storage devices and magnetically coupled to said cores, means connecting each set of secondary windings individually to a decimal position in each of said multiorder storage devices, an output circuit, means for selectively connecting each of said sets of secondary windings to said output circuit, a pair of primary windings magnetically coupled to each of said cores, a set of input signal lines connected with said primary windings according to a two-out-of-five code configuration, and means to selectively and successively pulse said signal lines so as to produce a saturating level of flux in the cores having their primary windings connected with said signal line being pulsed whereby the formation of transient magnetic flux in the core produces an output signal in the secondary windings which is applied to said output circuit.

5. A decimal to two-out-of-five code translator comprising a plurality of multiorder storage devices having a plurality of decimal number positions for storing data thereat, circuit means commonly connecting like orders of said multiorder storage devices, first means for selectively and successively connecting each order of said multiorder storage devices with ground, a set of saturable cores corresponding to each of the decimal number positions and made of magnetically permeable material having substantially non-square hysteresis loop properties, a plurality of sets of secondary windings, there being one complete set for each of said multiorder storage devices and magnetically coupled to said cores, means interconnecting each decimal number position of said multiorder storage device with its corresponding secondary winding, an output circuit including a resistor, a selective switching device for successively connecting each of said sets of secondary windings to said output circuit, a pair of primary windings magnetically coupled to each of said cores, a set of input signal lines connected with said primary windings according to a two-out-of-five code configuration, and a selective switching device for selectively and successively pulsing said signal lines so as to produce a saturating level of flux in the cores having their primary windings connected with said signal line being pulsed, whereby the formation of transient magnetic flux in the cores produces an output signal in the secondary windings, one of which is applied to the output circuit according to the connections made by said first and second connecting means and as a result of the digital data stored in the multiorder storage device being read out.

References Cited in the file of this patent

UNITED STATES PATENTS

| | | |
|---|---|---|
| 2,782,399 | Rajchman | Feb. 19, 1957 |
| 2,912,679 | Bonorden | Nov. 10, 1959 |
| 2,973,506 | Newby | Feb. 28, 1961 |